Sept. 21, 1971     M. W. VERBERG     3,606,893
SAFETY ASH TRAY FOR VEHICLES
Filed March 13, 1970     2 Sheets-Sheet 1
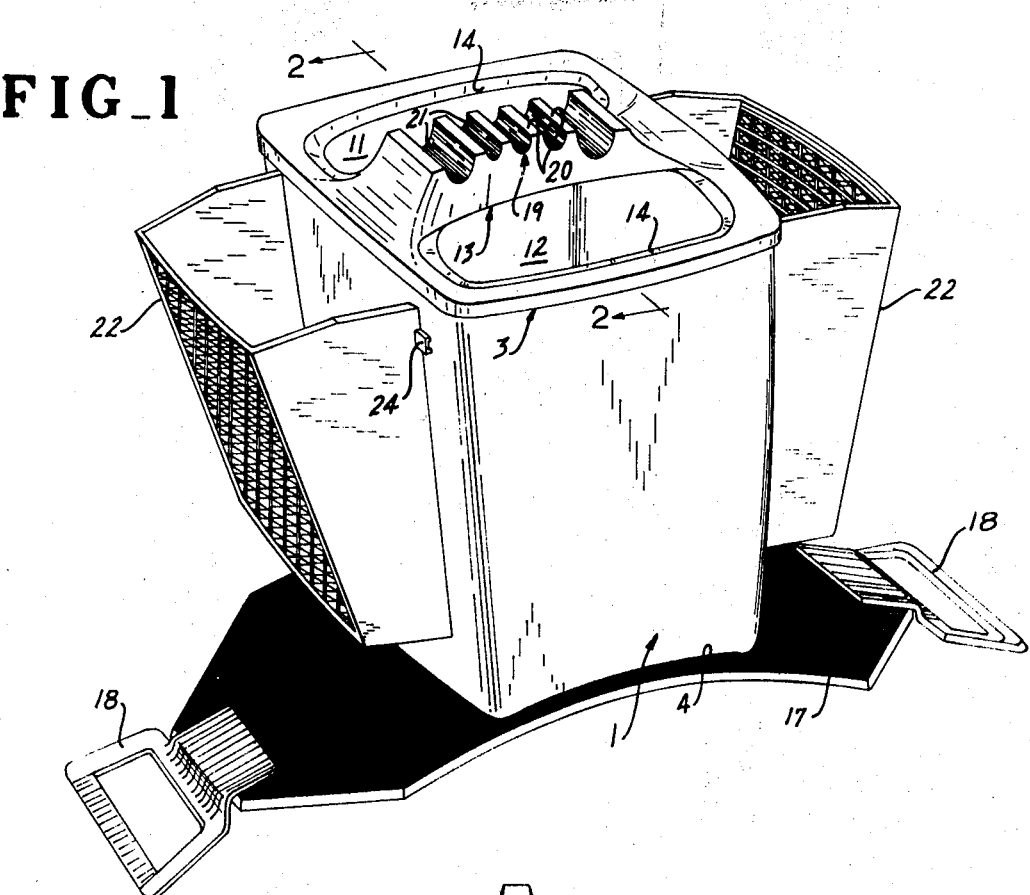
FIG_1
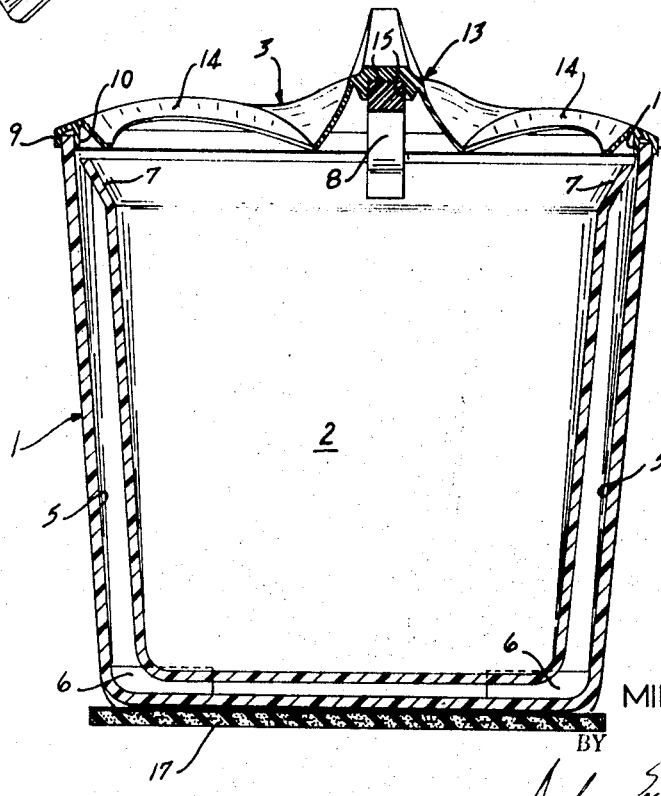
FIG_2
INVENTOR.
MILTON W. VERBERG
BY
Attorneys Sept. 21, 1971    M. W. VERBERG    3,606,893
SAFETY ASH TRAY FOR VEHICLES
Filed March 13, 1970    2 Sheets-Sheet 2
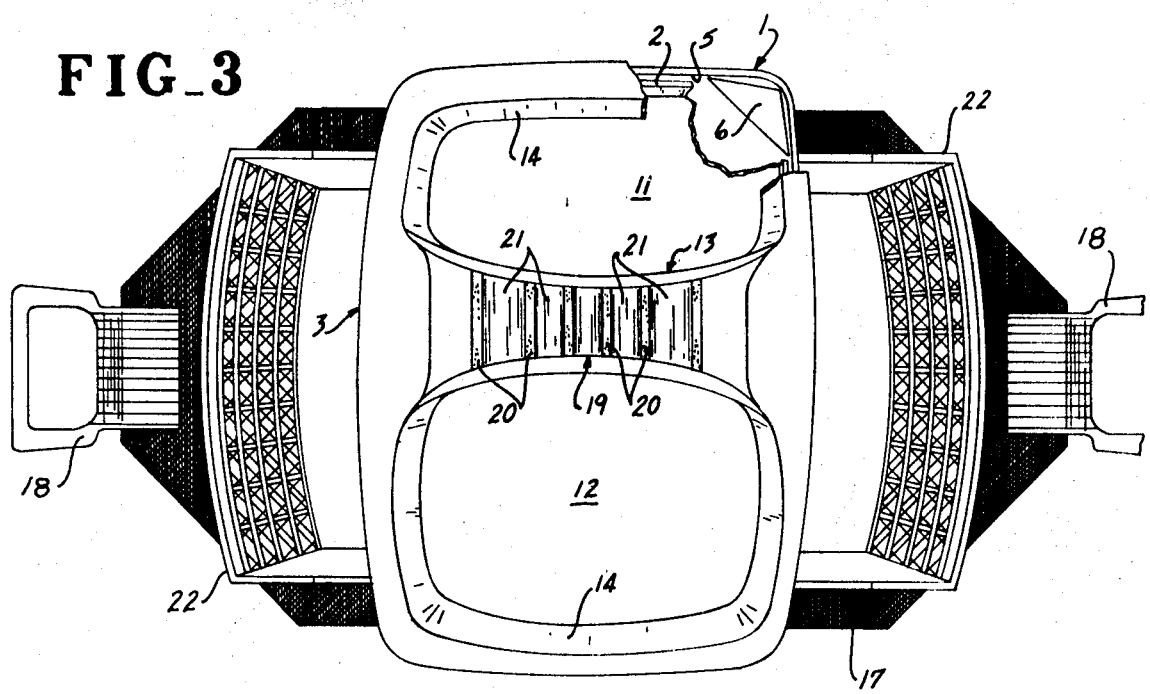
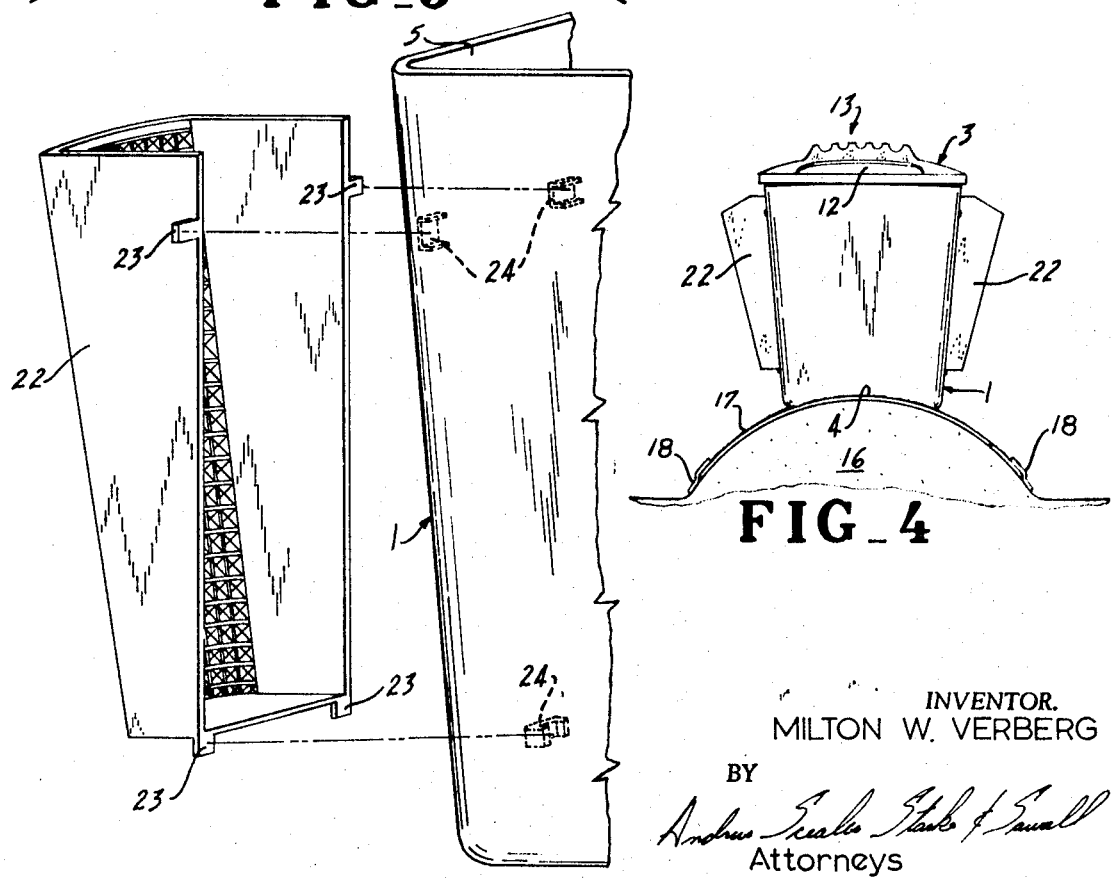
INVENTOR.
MILTON W. VERBERG
BY
Attorneys

United States Patent Office 3,606,893
Patented Sept. 21, 1971

3,606,893
SAFETY ASH TRAY FOR VEHICLES
Milton W. Verberg, 3069 S. 36th St.,
Milwaukee, Wis. 53215
Filed Mar. 13, 1970, Ser. No. 19,208
Int. Cl. A24f 19/02
U.S. Cl. 131—232                10 Claims

ABSTRACT OF THE DISCLOSURE

A bucket type container has an inner removable ash tray of substantial depth adapted to be partially filled with water. A removable cover for the container has a handle extending across the same between two large openings and providing holding means for cigarettes whereby the lighted end of the cigarette is always positioned above either opening so that the ashes will always drop into the water and become extinguished. The structure provides a guard which prevents ashes from falling into the space between the inner tray and the outer container. A strip of rubber-like material such as rubber backed carpeting is secured to the bottom of the container and is adapted to support and retain the container in an upright position on the floor of an automobile or on a boat deck or the like. The bottom of the container may be curved or crowned to apply to the drive shaft hump in an auto floor board. One or more bins may be hung on the sides of the container for storing smoking material or for use in retaining waste and the guard consists of an inclined wall portion on the upper end of the inner tray which is available for use as a pipe knocker.

BACKGROUND OF THE INVENTION

This invention relates to a safety ash tray for vehicles such as automobiles, boats and the like which are susceptible to rocking movement.

Most built-in automobile ash trays are not in a convenient location for the driver to use while driving, and are not adequate for extinguishing lighted cigarette and cigar butts. As a consequence many drivers and passengers have developed the habit of opening the side vents to drop the butts outside as the car is traveling, a habit that violates the law in many cases since it is hazardous and tends to start fires particularly in dry brush and forest areas.

Since the elimination of side vent windows the attempt to throw a lighted cigarette butt through the large side window of a passenger auto has become even more hazardous due to a back draft which often results in the released lighted butt returning into the car and starting a smoldering fire in the car upholstery.

SUMMARY OF THE INVENTION

The present invention provides an ash tray of substantial capacity and depth partially filled with water for the quick and sanitary extinguishing of lighted cigarette and cigar butts. The tray is stably located on the normal transmission hump or floor just in front of the seat where it can be reached readily by the driver and passenger without taking the eyes from the road ahead and without the necessity of a light at night.

The construction of the ash tray provides for appropriate gripping of a lighted cigarette or cigar in a position on the cover of the ash tray wherein the lighted end is always disposed over an opening to the water inside so that any ashes will automatically drop into the water in case the cigarette or cigar is not removed.

The tray generally comprises an outer bucket-like container with an inner removable tray of substantial depth for receiving water therein. A cover on the container has a cross member generally interlocking with the cross handle of the tray to stabilize the same. A suitable cigarette and cigar holder is provided on the cross member and large openings on either side of the member provide for dropping of the ashes from a cigarette mounted in the holder into the water beneath.

It is preferable to offset the cross member and provide a larger opening on the outer side to accommodate the placing of lighted cigars on the holder. The edges of the outer opening are flanged downwardly to provide a substantially vertical surface within the container against which a pipe smoker may conveniently tap his pipe.

The ash tray may have a flare at its uper edge to generally close the space between it and the outer container, and this, coupled with the general shape of the cover, prevents any dropping of the ashes or cigarette butts into the space between the inner and outer containers.

The mounting of the container on the floor of the car is stabilized by removably attaching the bottom of the container to a strip of sponge rubber or the like which effectively grips the floor of the car just ahead of the seat and supports the container upright thereon.

The strip generaly drapes over the transmission or drive shaft hump in the car floor and the tray may have its bottom curved complementary with the hump to prevent dislodgement, thereby stabilizing the position of the ash tray regardless of the swaying or rocking movement of the car.

The height of the ash tray is such as to have the cover come near to the level of the front seat of the auto so that the tray is at a covenient height for the driver and passenger to reach without undue body movement and without looking, a feature which is particularly important for safe driving.

The crown or arch in the container bottom generally fits the drive shaft hump in the floor of an automobile and thereby orients the tray and particularly the cover and cigarette retainer with respect to the seat.

One or more storage bins, usable for retaining additional cigarette packages or for waste, may be hung on the sides of the container.

BRIEF DESCRIPTION OF THE DRAWING

The accompanying drawings illustrate the best mode presently contemplated by the inventor for carrying out the invention.

In the drawings:

FIG. 1 is a perspective view of the ash tray according to the present invention;

FIG. 2 is a vertical central longitudinal section taken substantially on line 2—2 in FIG. 1;

FIG. 3 is a top plan view of the construction of FIG. 1 with parts broken away and sectioned;

FIG. 4 is a detail view showing the mounting of the unit in a car; and

FIG. 5 is a detail view showing the mounting for a side bin.

DESCRIPTION OF THE PREFERRED EMBODIMENT

Referring to the drawing, the ash tray comprises an outer container 1, an inner container 2 and a cover 3.

The outer container 1 has an arched bottom 4 and is of generally rectangular bucket shape and open at the top with walls 5 of substantial depth. Suitable sponge rubber generally triangular corner blocks 6 are mounted in the bottom corners of container 1 for a cushion support for the inner container 2.

The inner container 2 is generally of the same shape as container 1 to fit therein, and may have an outwardly flared rim 7 fitting closer to the walls 5 of the outer container 1. A handle 8 is molded integral with or secured to the upper rim 7 of container 2. The handle 8 is arched to provide for engagement and interlock with the cover 3.

The cover 3 is crowned and has a downwardly extending peripheral flange 9 at its outer edge and a downwardly extending flange 10 spaced inwardly therefrom to receive the upper edge of the walls 5 of container 1 therebetween. Two large generally elliptical openings 11 and 12 are provided to cover 3 with a cross member 13 therebetween. The edges of openings 11 and 12 are flanged downwardly as at 14, and which flanges may extend as guards to prevent ashes from entering the space between containers 1 and 2.

The cross member 13 has a longitudinal groove 15 facing downwardly therein for receiving and interlocking with the handle 8 of container 1. By reason of the interlock between cross member 13 and handle 8 the cover 3 may be oriented with respect to the containers so that the cross member 13 extends transversely of the car, as shown in FIG. 4. This is further assured by orienting the inner container 2 relative to the outer container 1 and its support, as by making the containers wider in one direction than they are in the other direction so that the inner container can only be fitted into the outer container when the handle 8 extends in the direction of and registers with cross member 13.

In the construction illustrated the handle 8 and cross member 13 are offset rearwardly toward the seat of the car so that forward opening 12 is considerably larger than the rear opening 11 in cover 3. This has a number of advantages, among which are facilitating the tapping of the bowl of a pipe against the flange 14 of the larger opening 12 and providing for the safer positioning of lighted cigars in a recess in cross member 13 (as will be described hereinafter) with assurance that the lighted end of the cigar will lie over the opening.

The container 1 is mounted upright on the usual hump 16 in the floor of an auto as shown in FIG. 4. For this purpose the bottom 4 of container 1 is secured by any suitable means to a non-slip strip 17 of flexible gripping material such as a rubber backed piece of carpeting or a sponge rubber strip.

The strip 17 drapes down the sides of hump 16 and is retained thereon as shown in FIG. 4. A suitable handle 18 may be provided at each end of strip 17 to facilitate manual lifting of the unit for installation and removal of the same.

A cigarette holder or retainer 19 is mounted on cross member 13 of cover 3 and may be constructed of a molded plastic strip secured in place and providing raised prongs 20 with transverse spacing 21 therebetween as shown in FIGS. 1–3, for receiving a lighted cigarette or cigar. For this purpose certain of the spaces 21 are small to accommodate cigarettes and certain of the spaces are large to accommodate cigars.

The cigarette retainer 19 holds a lighted cigarette with its lighted end over either opening 11 or opening 12 where any burning ashes fall into the container 2. When a lighted cigar is held by retainer 19 the lighted end always faces outwardly from the car seat and over the larger opening 12.

To provide increased safety and to extinguish lighted butts without effort container 2 is to be filled to a suitable level with water. This additionally tends to reduce and/or eliminate odors.

When it is desired to empty the ash tray the cover 3 is removed and the inner container 2 lifted out by the handle 8 and cleaned, after which the container 2 is replenished with the desired amount of water and replaced in container 1, and the cover 3 again applied to the containers.

One or more bins 22 may be removably hung from the sides of container 1 as shown in FIGS. 4 and 5 for the purpose of storing cigarettes or cigars, or for use in receiving waste material.

A practical mounting for a bin 22 is illustrated in FIG. 5 where the two bottom corners and the two top corners of the bin are provided with projections 23 which are received in and behind complementary loops 24 on the side wall of container 1.

The invention provides a more convenient location for the ash tray in an automobile, and improved safety against fires.

Various modes of carrying out the invention are contemplated as being within the scope of the following claims particularly pointing out and distinctly claiming the subject matter which is regarded as the invention.

I claim:

1. A safety ash tray for vehicles and the like comprising a bucket type container of substantial depth and adapted to be partially filled with water, a removable cover therefor having a cross member with a retainer for lighted cigarettes, and having two openings on opposite sides of the cross member and of a size to accommodate a lighted cigarette in the retainer with the lighted end always disposed over one of the openings and having a cross handle within said container beneath the cover cross member, and said handle having interlocking means adapted to engage with the cross member of said cover.

2. The construction of claim 1 in which the container comprises an outer container and a removable inner container, and the cover generally prevents cigarette ashes from falling into the space between the containers.

3. The construction of claim 2 in which the cover is supported primarily by the outer container, and said cross handle is mounted on said inner container.

4. The construction of claim 1 and a mounting for said container comprising a non-slip strip of generally flexible material secured to the bottom of said container and supporting the same stably upon a surface.

5. The construction of claim 1 in which said cross member is offset to provide a substantially larger opening on one side thereof than on the other, and said retainer is adapted to selectively accommodate both cigarettes and cigars with the latter always oriented to dispose the lighted ends thereof over the larger opening.

6. The construction of claim 5 in which at least the larger opening is defined by one edge that is flanged downwardly to accommodate the tapping of a pipe bowl thereagainst within the opening and over the water in the container.

7. An ash tray as claimed in claim 4, in combination with a passenger automobile having a seat extending generally transversely thereof and a floor in front of said seat, and wherein said strip is disposed on said floor and extends transversely of the automobile to orient said cigarette retainer to hold lighted cigarettes forwardly from the front edge of the seat and with the lighted end directed away from the seat.

8. The construction of claim 7 in which the automobile has a drive shaft hump in the middle of the floor in front of the seat, and the flexible strip drapes laterally upon the hump, and the cover for the container is generally at the same height as the seat.

9. The construction of claim 8 in which the bottom of the container is arched to generally fit upon said hump.

10. The construction of claim 1 and a bin removably secured to a side wall of said container.

References Cited

UNITED STATES PATENTS

| | | | |
|---|---|---|---|
| D. 151,672 | 11/1948 | Armus | 131—240UX |
| D. 155,020 | 8/1949 | Manns | 131—242UX |
| 939,909 | 11/1909 | Grünthal | 131—240X |
| 1,468,372 | 9/1923 | Bondlin | 131—241X |
| 2,068,513 | 1/1937 | Reimer | 131—240X |
| 2,083,392 | 6/1937 | Nereim | 131—240R |
| 2,172,161 | 9/1939 | Du Prey | 131—240R |
| 2,213,046 | 8/1940 | Mather | 131—240R |
| 2,250,178 | 7/1941 | Brush | 131—240R |
| 3,394,712 | 7/1968 | Herr et al. | 121—241X |
| 3,522,812 | 8/1970 | Chism et al. | 131—242 |

FOREIGN PATENTS

| | | | |
|---|---|---|---|
| 360,186 | 11/1931 | Great Britain | 131—241 |
| 399,615 | 10/1933 | Great Britain | 131—240R |
| 269,587 | 7/1950 | Switzerland | 131—242 |

JOSEPH S. REICH, Primary Examiner

U.S. Cl. X.R.

131—236, 241, 242; 220—4